United States Patent [19]
Shidara et al.

[11] Patent Number: 5,796,490
[45] Date of Patent: Aug. 18, 1998

[54] DOCUMENT READER SYSTEM

[75] Inventors: Shinichi Shidara; Yutaka Takahashi; Hajime Tachibana, all of Tokyo; Kiyoji Nakamura, Kanagawa; Ushio Anayama, Kanagawa; Noriyasu Ishiwata, Kanagawa, all of Japan

[73] Assignee: Fuji Photo Film Co., Ltd., Kanagawa, Japan

[21] Appl. No.: 677,972

[22] Filed: Jul. 10, 1996

[30] Foreign Application Priority Data

Jul. 10, 1995 [JP] Japan ................... 7-195728

[51] Int. Cl.$^6$ ................... H04N 1/21; G03G 15/00
[52] U.S. Cl. ........... 358/296; 358/302; 358/483; 358/498; 399/367; 399/397; 399/110
[58] Field of Search ................... 358/296, 302, 358/400, 401, 471, 474, 482, 483, 498; 355/54, 77; 399/1, 2, 107, 108, 110, 118, 367, 373, 378, 397, 403–405

[56] References Cited

U.S. PATENT DOCUMENTS

| | | | |
|---|---|---|---|
| 4,839,740 | 6/1989 | Yoshida | 358/443 X |
| 4,864,420 | 9/1989 | Aiko | 358/302 |
| 4,905,098 | 2/1990 | Sakata | 358/468 |
| 4,910,612 | 3/1990 | Yamazaki | 358/498 |
| 5,078,379 | 1/1992 | Leisner | 399/367 |
| 5,339,134 | 8/1994 | Nakamura et al. | 358/444 X |
| 5,339,139 | 8/1994 | Fullerton et al. | 399/367 X |
| 5,491,557 | 2/1996 | Nakajima et al. | 358/296 |
| 5,550,639 | 8/1996 | Sugita | 358/302 |
| 5,627,650 | 5/1997 | Nosaki et al. | 358/296 |

FOREIGN PATENT DOCUMENTS 6289494  3/1993  Japan.

*Primary Examiner*—Peter S. Wong
*Attorney, Agent, or Firm*—Sughrue, Mion, Zinn, Macpeak & Seas, PLLC

[57] ABSTRACT

There is provided a document reader system for reading images of a large number of document papers while continuously feeding the document papers from an auto-feeder to a scanner so that image data read by the scanner can be supplied to a computer, which can easily meet various requirements of different users, easily satisfy a user having only a scanner and planning to purchase a microfilm camera additionally, reduce space needed for installing the whole system without providing double auto-feeders and stackers for the scanner and the microfilm camera, and which allows makers to easily provide various types of systems to meet user's requirements. The system includes a turn unit removably attached to the scanner so that the document papers passing through and ejected from the scanner can be returned to a stacker provided in the scanner. Each device portion of the system is formed as a unit so that various types of document reader systems can be obtained by combining necessary units.

9 Claims, 6 Drawing Sheets

(A) SCANNER TYPE (B) SCANNER AND MICROFILM CAMERA

DOCUMENT READER SYSTEM

BACKGROUND OF THE INVENTION

1. Field of the Invention

The present invention relates to a document reader system for reading images or data of a large number of document papers such as slips (order slips, advice slips, note etc.), and photographing the read images or data of the documents on a microfilm as required.

2. Prior Art Statement

Since daily industrial activities involve a great deal of paperwork, often the need arises for recording images or data of a large number of papers such as slips and applications on an optical disk or a microfilm for the purpose of long-period storage.

For example, Japanese Patent Laid-Open Publication No. 6-289494 discloses a system in which images of papers (documents) are read by a CCD array unit (line sensor) and the read image data are stored in a memory so that they can be displayed on a liquid crystal display panel. The system also includes a photographic device (microfilm camera) for photographing the read image data by forming the images on a microfilm through an optical system. Also, there is known in the art a scanner having only a document scanning function, in which images of documents are read, and the read image data are stored in a memory as well as supplied to other personal computer (PC) or work station (WS). As to a photographic function, there is used a well-known microfilm camera such as a rotary camera for continuously photographing images of documents on a microfilm.

As such above, a conventional document reading and photographic system uses either a scanner and microfilm camera independent of each other or combined scanner and microfilm camera. If a user having only a scanner plans to purchase a microfilm camera additionally, the user must purchase either a special microfilm camera or a new system consisting of a scanner and a microfilm camera.

In the former case, i.e., when purchasing a special microfilm camera, space needed for installing the whole system increases, so that the system is enlarged as a whole. The system also needs double auto-feeders for supplying document papers to the scanner and the microfilm camera and double stackers for collecting document papers ejected therefrom. In the latter case, i.e., when purchasing a combined scanner and microfilm camera system, another problem arises that the scanner or the microfilm camera previously installed runs to waste. On the other hand, makers are required to provide plural types of special devices to meet user's requirements.

SUMMARY OF THE INVENTION

The present invention has been accomplished under the circumstances as aforementioned, and an object thereof is to provide a document reader system to easily meet various requirements of different users, for example, one user needs only a scanner and the other user needs both a scanner and a microfilm camera, which can easily satisfy a user having only a scanner and planning to purchase a microfilm camera additionally.

Another object of the present invention is to provide a document reader system which reduces space needed for installing the whole system without providing double auto-feeders and stackers for the scanner and the microfilm camera.

Still another object of the present invention is to provide a document reader system and which allows makers to easily provide various types of systems to meet user's requirements.

The present invention is to provide a unit system in which each device portion is formed as a unit so that various types of document reader systems can be obtained by combining necessary units.

Namely, the above object of the present invention is attained by the provision of a document reader system for reading images of a large number of document papers while continuously feeding the document papers, comprising:

- a scanner for reading the document papers while feeding the document papers in a paper feeding path;
- an auto-feeder for continuously feeding the document papers to said scanner;
- a stacker provided in said scanner for receiving the document papers read by and ejected from said scanner; and
- a turn unit removably attached to said scanner for returning the document papers, which passed through and were ejected from said scanner, to said stacker through another feeding path in the said scanner.

In the document reader system, the auto-feeder, the scanner and the turn unit are arranged in this order from the front side facing an operator toward the inner part or back side. The stacker is preferably provided in the upper portion of the scanner. Further, a microfilm camera can be provided between the scanner and the turn unit, in which the papers (documents) are turned around by the turn unit, fed through the microfilm camera again but in the reverse direction, and returned to the stacker.

The microfilm camera has a cabinet with the top plane formed into an L-type shape and surrounding the back and one side of the scanner. Microfilm cassette loading ports are preferably provided on the front panel of the cabinet and at the side of the auto-feeder on purpose to improve operability. Further, a multi-sorter may be connected to the scanner instead of the turn unit for sorting and stacking the papers (documents).

BRIEF DESCRIPTION OF THE DRAWINGS

The above and other objects and advantages and further description will now be discussed in connection with the drawings, in which.

DETAILED DESCRIPTION OF THE PREFERRED EMBODIMENTS

Figure 1:
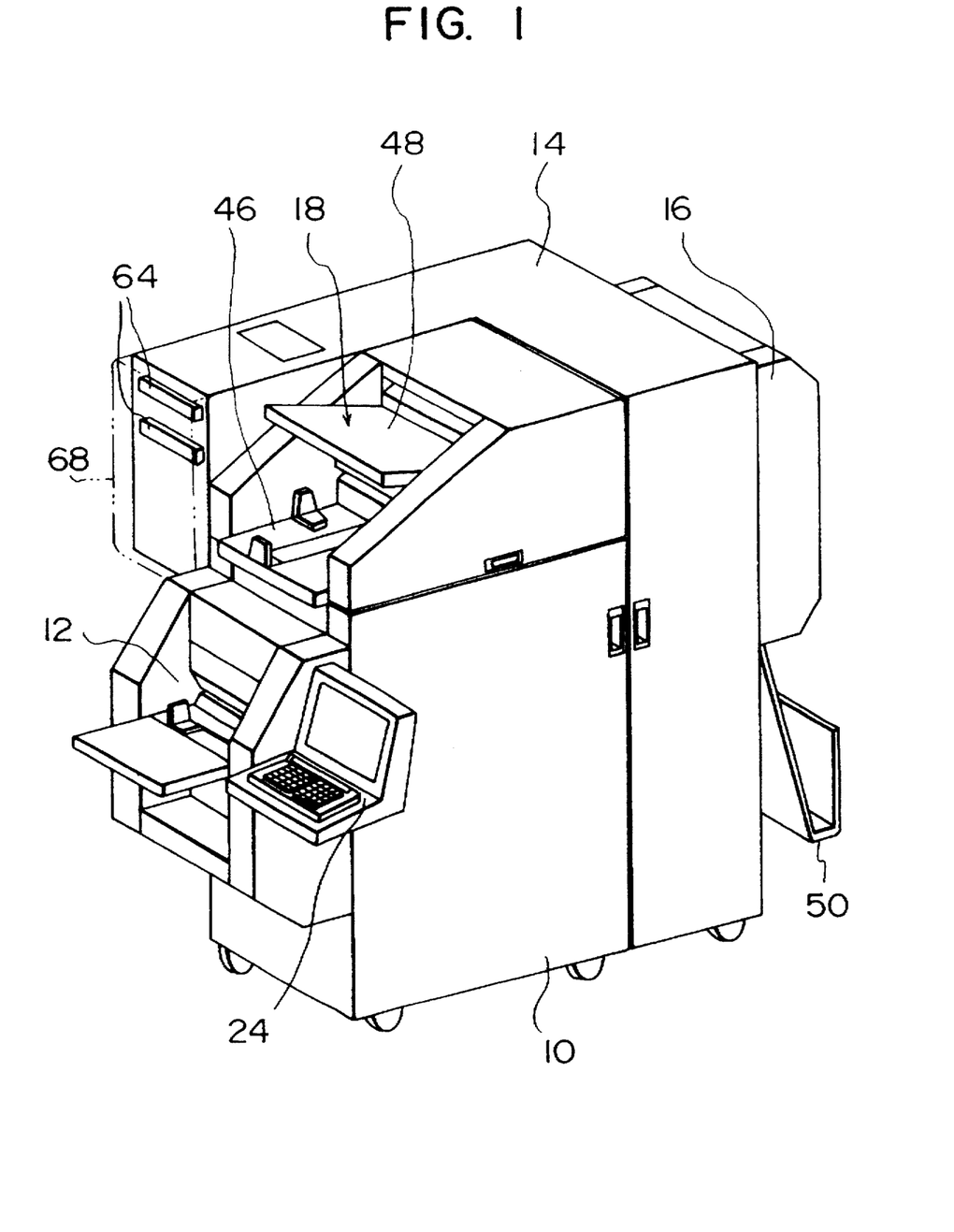
FIG. 1 is a perspective view showing a general structure of a document scanner system consisting of a document reader and a microfilm camera according to an embodiment of the present invention.
Figure 2:
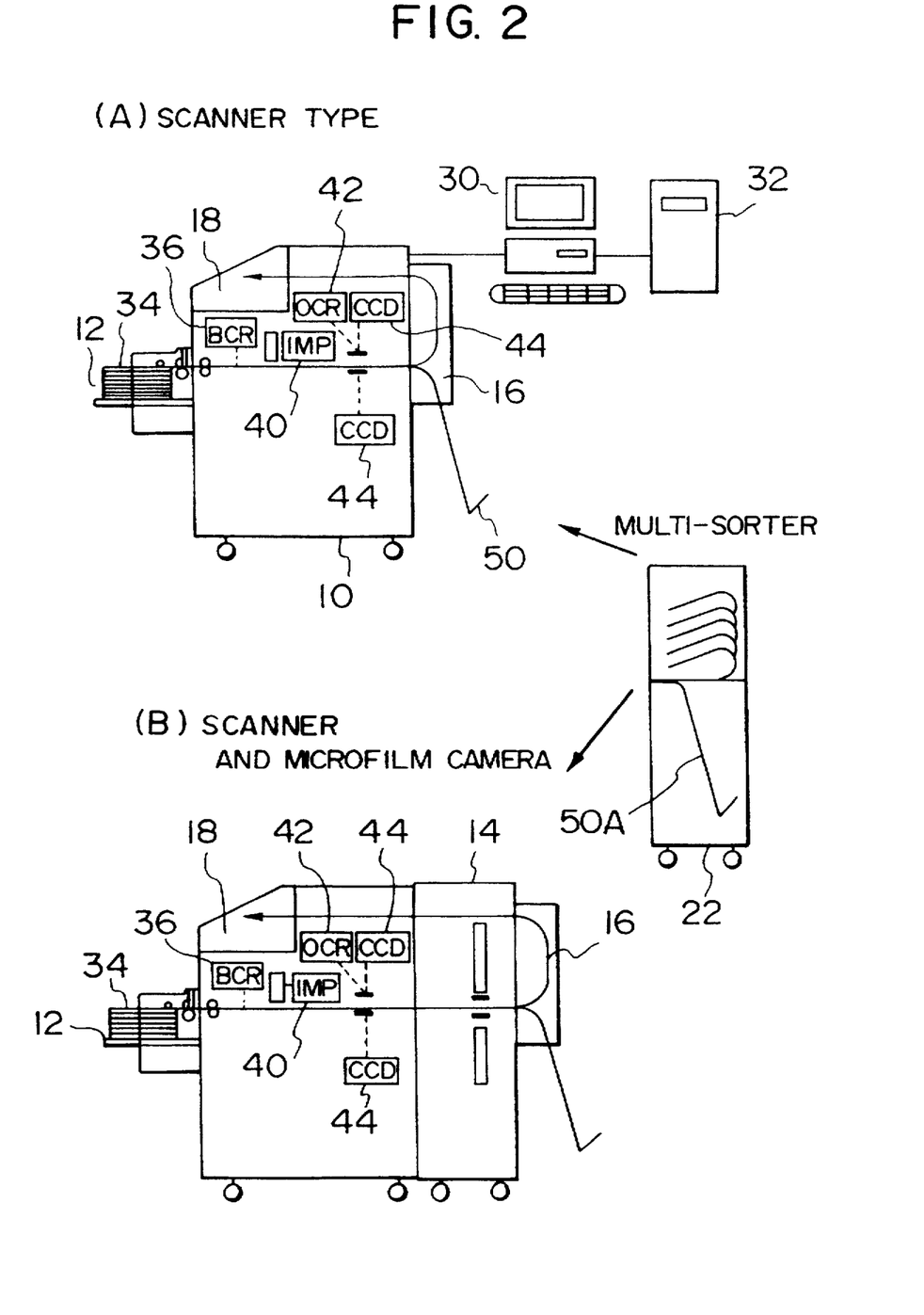
FIG. 2 shows two simplified diagrams explaining how to use the document reader in FIG. 1.
Figure 3:
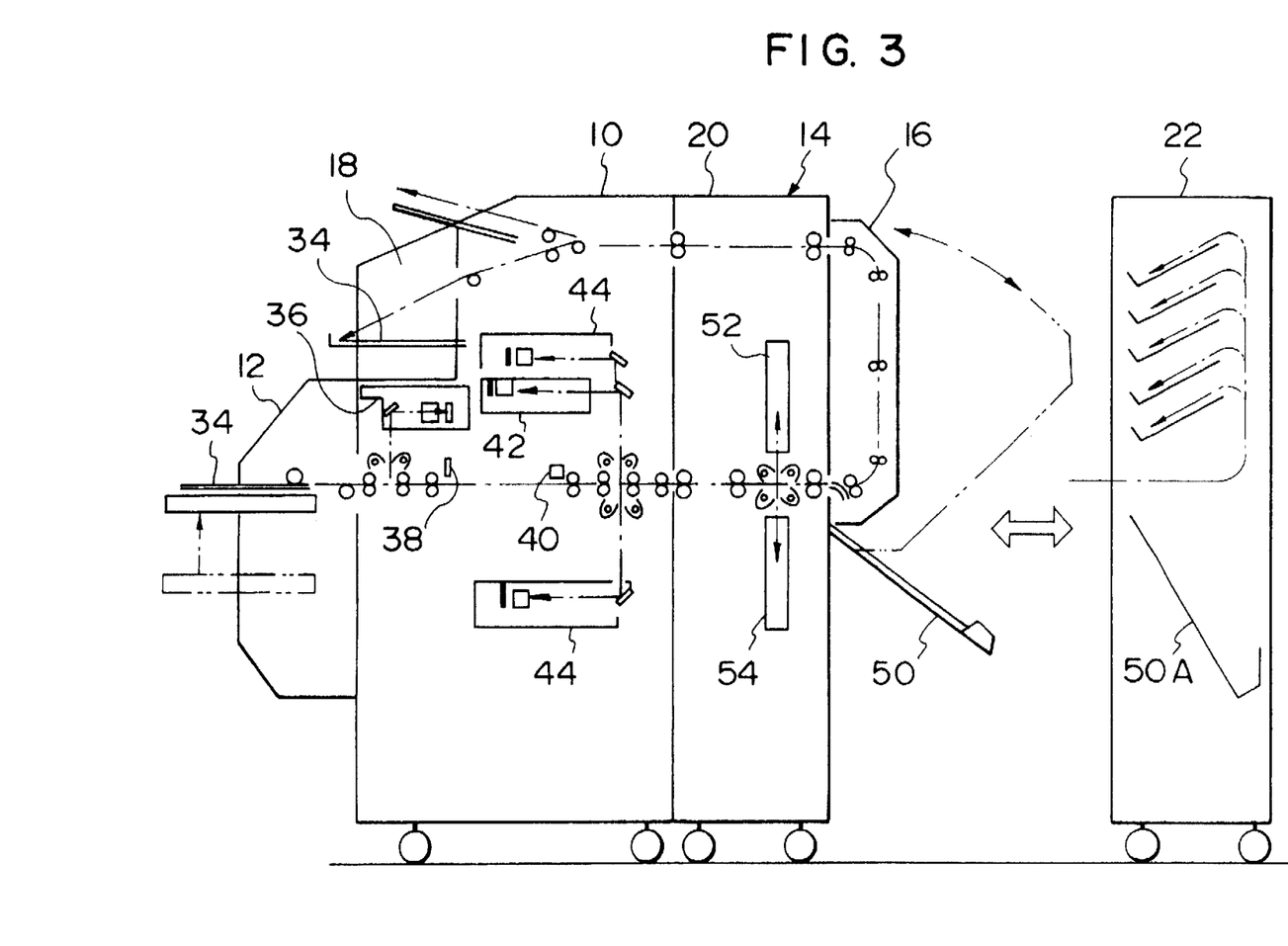
FIG. 3 is a side view showing an inner arrangement of the combined document reader and microfilm camera in FIG. 1.
Figure 4:
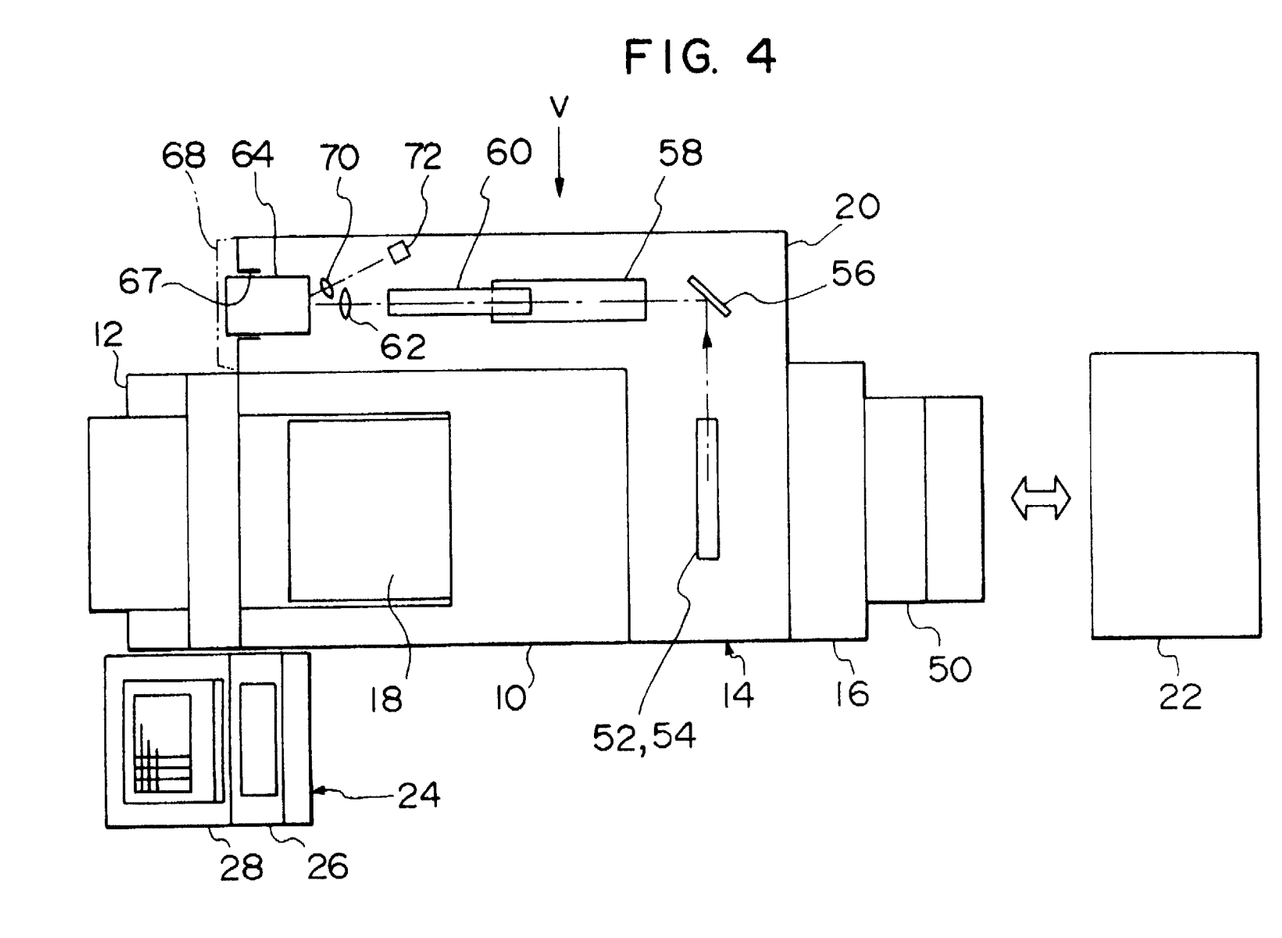
FIG. 4 is a plan view of the combined document reader and microfilm camera in FIG. 1.

Referring to FIGS. 1 to 4, there are shown a scanner 10, an auto-feeder (automatic document feeder: ADF) 12, a microfilm camera 14, a turn unit 16 and a stacker 18. The auto-feeder 12 is removably attached to the front of the scanner 10. The microfilm camera 14 has a cabinet with the top plane formed into an L-type shape (FIG. 4) and surrounding the back and left sides of the scanner 10. In FIGS. 2 to 4, a reference numeral 22 denotes a multi-sorter which can be used instead of the turn unit 16.

Referring to FIGS. 1 and 4, there is shown a control unit 24 with a display 26 and a keyboard 28. The control unit 24 is used to display a status and to input or set conditions for controlling the whole system. For example, the control unit 24 is used to select and set reading conditions of the scanner 10 and a photographing mode of the microfilm camera 14.

In FIG. 2, a reference numeral 30 denotes a personal computer PC (or a work station WS), in which image data and associated attribute information read by the scanner 10 are input to be subjected to a predetermined image processing or processings, and the processed image data is stored in a memory such as magneto-optic disk 32. The processed image data may be supplied to a printer (not shown) as required, or transferred to other computer or image processor.

The scanner 10 is provided with carrying means for carrying document papers 34 one by one from the auto-feeder 12 horizontally and linearly in a back side direction. Each paper (document) 34 first passes through a bar-code reader (BCR) 36, and a bar code attached to the paper 34 in a predetermined position is read by the bar-code reader 36. The bar code contains some information of the paper 34, which is used to identify set conditions of the paper 34 based on the format number or the like and to automatically select a reading mode from all modes previously set, the selected reading mode containing reading conditions needed for an OCR 42 and an image scanner 44 described later.

The reading mode is used to set some reading conditions, such as the image cutout position, discrimination between single-sided and double-sided reading and discrimination between ON and OFF of the scanner 10 or the microfilm camera 14. The reading data is supplied to the PC (or WS) 30. On receipt of the reading data, the PC (WS) 30 supplies a specified number to an imprinter 40 described later. It should be noted that an OCR (Optical Character Reader) for reading characters may be used instead of the bar-code reader 36 for reading a bar code.

The paper 34 then passes through a patch reader 38 (FIG. 3). The patch reader 38 detects mark changing information for changing a mark such as a blip mark to be attached when photographing an image of the paper 34 on a microfilm. For example, the patch reader 38 sorts data contained in respective documents into the classification levels such as high, intermediate or low level by a certain criteria, according to the partition plate or sheet inserted between document papers. The patch reader 38 may detect data for automatically switching the scanner 10 or the microfilm camera 14. The data detected by the patch reader 38 are transferred as document or page attribute information to the external PC (WS) 30 via a data transfer interface.

The paper 34 is then numbered by the imprinter (IMP) 40. For example, a document number is attached to the paper 34, such as the specified number, which was supplied from the PC (WS) 30 in response to the output of the bar-code reader 36, or an ordinal number of the paper 34 which was set in the control unit 24. The OCR 42 reads data containing the document number attached to the paper 34 and supplies the read data to the PC (WS) 30. The read data is either stored in a memory as document or page attribute information together with image data to be read by the image scanner 44 described later, or transferred to the external PC (WS) 30 via an interface.

Represented by reference numerals 44, 44 are image scanners (CCD) each including a CCD arrayed line sensor. The line sensors are arranged perpendicularly to a moving direction of images printed on the front and back faces of the document papers 34 traveling at a constant speed, so that the line sensors read the images of the papers 34 continuously while the papers 34 travel therebetween, i.e., while the papers 34 move in a sub-scanning or vertical scanning direction. That is, the line sensors read the images of the papers 34 by a slit exposure system.

The CCD 44 cuts out an image in a partial area of a paper 34 in accordance with instructions from the control unit 24 or instructions previously input from the PC (WS) 30 to the CCD line sensor 44. The cutout image is transferred to the PC (WS) 30 via an interface together with image attribute information. The CCD 44 also selects a reading mode automatically based on a format number of the paper 34 read by the bar-code reader 36, and determines the image cutout position, single-sided reading or double-sided reading, and ON or OFF state of the scanner 10 or the microfilm camera 14. Thus, image reading is performed as a result of such determination. Alternatively, the CCD 44 may obtain reading conditions, such as the image cutout position, which is specified by the PC (WS) 30 based on the format number of the paper 34 detected by the bar-code reader 36, and transfer the image data to the PC (WS) 30 together with other attribute information.

When using such a device structure in a scanner, as shown in the upper part (A) of FIG. 2, the turn unit 16 is connected to the back side of the scanner 10. The turn unit 16 forces document papers 34 ejected from the back side of the scanner 10 to make a U-turn upward and continuously feeds them through the return path positioned at the upper portion of the scanner 10 in a reverse direction. The document papers 34 reversely fed are stacked on the stacker 18 provided in the upper front portion of the scanner 10. The stacker 18 has a pass stacker section 46 (FIG. 1) for turning over the papers normally read and stacking them in the same order as numbered to the papers, and a reject stacker section 48 (FIG. 1) for stacking papers to be reread due to error operation separately from the papers normally read. Also, the reject stacker section 48 may be used for dividing previously processed papers into two groups, where one group of papers is sorted and stacked up on the reject stacker section 48.

The turn unit 16 and the scanner 10 are connected with each other through a separable joint (not shown), so that driving force of feed rollers provided inside the scanner 10 can be transmitted to the turn unit 16. As shown in the part (A) of FIG. 2, when connecting the turn unit 16 with the scanner 10, the turn unit 16 can feed papers at the same speed as the scanner 10 feed. Further, a straight stacker section 50 is used for ejecting unacceptable papers which are too thick to pass through the turn unit 16.

The multi-sorter 22 may be used instead of the turn unit 16. The multi-sorter 22 sorts and stacks papers 34 previously processed and ejected from the scanner 10, while it collects and stacks thick papers on a straight stacker section 50A.

As shown in the part of (A) of FIG. 2, such a structure is used in the scanner type document reader system. When adding a microfilm photographing function to the system, the microfilm camera 14 is provided between the scanner 10 and the turn unit 16. The lower part (B) of FIG. 2 shows a structure of a combined document reader and microfilm camera system. The microfilm camera 14 has a cabinet 20 with the top plane formed into an L-type shape as mentioned above, and an optical system is provided inside the cabinet 20 for transmitting images printed on the front and back faces of a paper 34 to be recorded on a microfilm.

Figure 5:
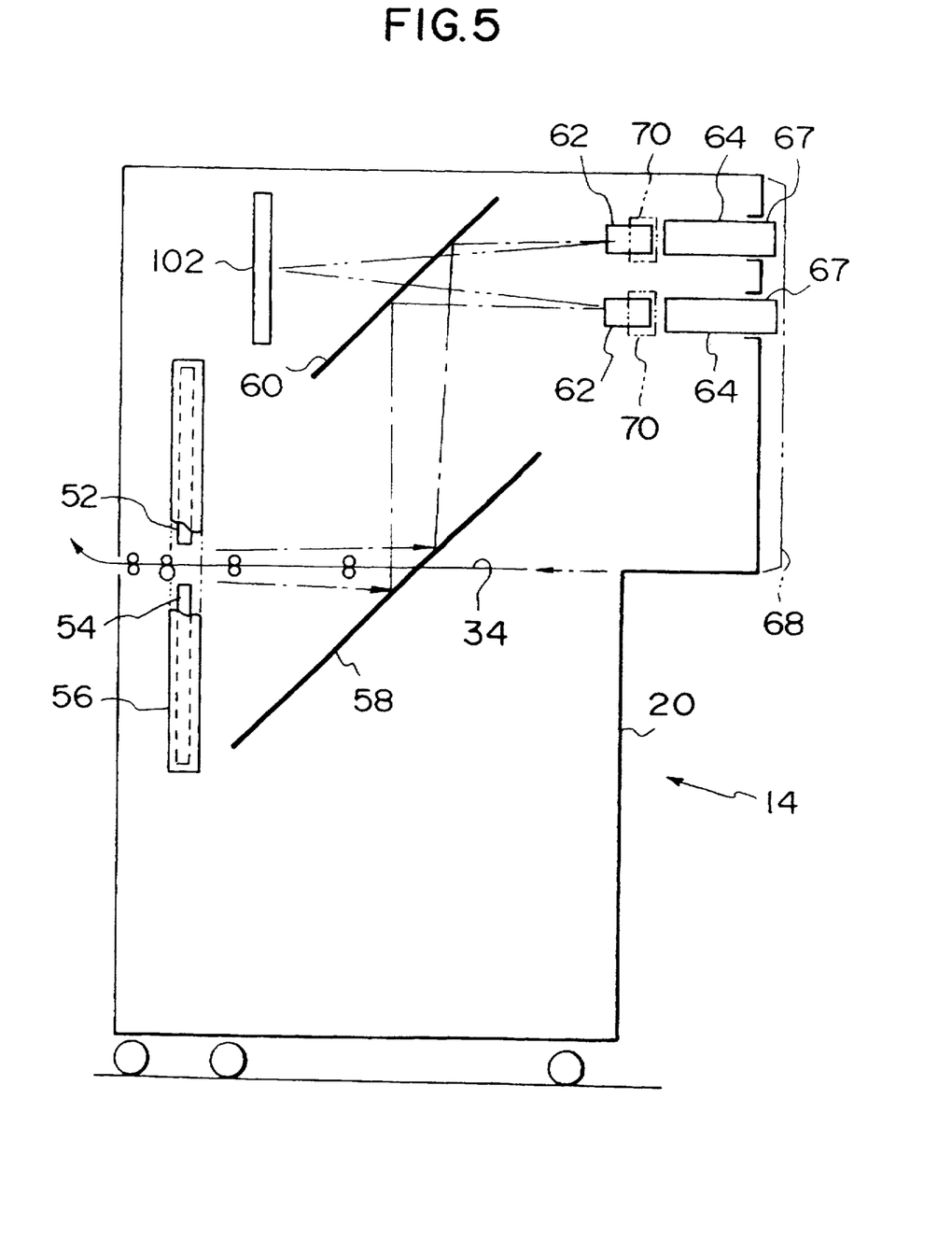
FIG. 5 is a side view showing an optical system of the microfilm camera in FIG. 1 as seen from the side represented by the arrow V in FIG. 4.
Figure 6:
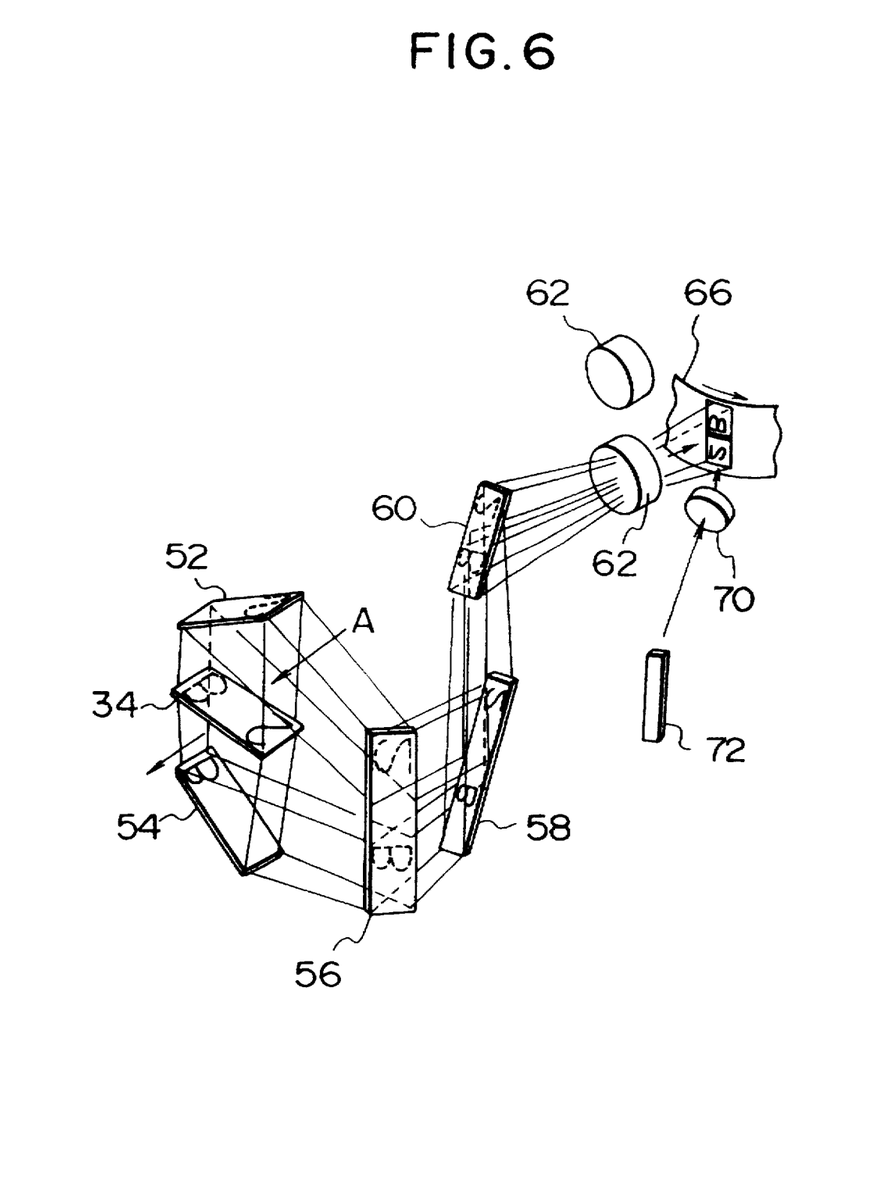
FIG. 6 is a perspective view of the optical system in FIG. 5.

As shown in FIGS. 4 to 6, the optical system includes first and second mirrors 52, 54 opposite to each other obliquely with respect to the front and back faces of the paper 34 and extending in a direction perpendicular to the traveling direction of the paper 34 (the direction represented by the arrow A in FIG. 6); third, fourth and fifth mirrors 56, 58 and 60 for simultaneously reflecting images on the front and back faces of the paper 34 which were reflected in both the mirrors 52, 54; and two photographic lenses 62, 62.

The photographic lenses 62, 62 are opposite to microfilm cassettes 64, 64, respectively, so that images reflected through the mirrors in the optical system can be photographed on microfilms 66 (FIG. 6) by a slit exposure system, each microfilm 66 mounted inside the corresponding microfilm cassette 64 and traveling at a constant speed. As shown in FIG. 6, the images on the front and back faces of the paper 34 are thus photographed on the microfilm 66 in parallel in the width side direction.

The microfilm cassettes 64, 64 are loaded into cassette loading ports 67, 67 from the front of the cabinet 20, respectively. The cassette loading ports 67, 67 are open vertically at two stages and situated on the front panel of the cabinet 20, i.e., provided at the left side of the stacker 18. The cassette loading ports 67, 67 are covered with a cover 68 on purpose to shut out light from the outside. Since the cassettes 64, 64 are positioned vertically at two stages so that images of the same paper can be photographed at the same time, simultaneous exposure can be performed to the two microfilms 66, 66, thereby improving efficiency of photographing process.

In addition, other auxiliary photographic-lenses 70, 70 are arranged close to the side of the photographic lenses 62, 62, respectively. Each lens 70 has an optical axis inclined or tilted in the length side direction of the film with respect to the line perpendicular to the film. On the optical axes of the lenses 70, 70, digital image generators 72, 72 such as LED (light-emitting diode) arrays are arranged in the width side direction of the film (where only one generator is shown in FIGS. 4 to 6).

The digital image generator 72 generates a one-dimensional image which varies in synchronous with the traveling speed of the film 66, and the generated image is photographed through the lens 70 on the film 66 currently in traveling. Thus the digital image generator 72 forms and records the two-dimensional digital image of the desired mark or other data on the film 66 nearby a photographed image of a document or superimposes it on the photographed image. For example, a name of the document, a title, a retrieval mark (e.g., a blip mark) and a number can be recorded on the film 66.

Although the above embodiment showed a system structure, in which the document papers 34 are fed horizontally from the front auto-feeder (ADF) 12 toward the inner part, and carried by the turn unit 16 to return to the upper portion of the front scanner 10, the document papers 34 may be carried laterally as seen from the front. In this case, the ADF, the scanner, the microfilm camera and the turn unit must be arranged in the lateral direction in this order. If ADF 12, turn unit 16 and stacker 18 of several types are held in reserve, the variety of combinations will increase.

As described above, according to the present invention, document papers are fed through and processed by a scanner, and the processed document papers ejected from the scanner are returned to a stacker provided in the scanner by a turn unit removably attached to the scanner. Thus, a user who does not need a microfilm camera can obtain an image document reader adapted for document reading only.

In this case, the auto-feeder, the scanner and the turn unit are arranged in this order from the front side toward the inner part, and the stacker is provided in the upper portion of the scanner, so that document papers are fed horizontally from the front side toward the inner part, forced to make a U-turn by the turn unit, fed through the upper portion of the scanner and returned to the stacker. Since the auto-feeder and the stacker are located on the front side, the image document reader is easy to operate.

When mounting a separable microfilm camera between the scanner and the turn unit, the system consisting of the document reader and the microfilm camera can easily meet the requirement of a user who needs to use a microfilm camera for storing image data of the document papers. In this case, the user has only to add the microfilm camera without changing the other units.

For this reason, the combined document reader and microfilm camera can remarkably reduce space needed for installing the whole system without providing double auto-feeders and stackers compared with the case a scanner and a microfilm camera are provided separately. Further, the makers can provide various types of document reader systems to meet user's requirements by combining necessary units.

The microfilm camera is formed into a substantially L-type shape to surround the back and one side of the scanner, and cassette loading ports for loading microfilm cassettes are provided near the side of the auto-feeder, so that operability of the document reader system can be improved. Further, a multi-sorter is connectable to the scanner instead of the turn unit for sorting and stacking document papers, and this makes it possible to further increase the variety of combinations.

What is claimed is:

1. A document reader system for reading images of a large number of document papers while continuously feeding the document papers, comprising:
    a scanner for reading the document papers wherein said scanner includes a front side, a back side, a right side, a left side, an inner portion, and first and second paper feeding paths;
    an auto-feeder for continuously feeding the document papers to said scanner;
    a stacker provided in said scanner for receiving the document papers read by said scanner; and
    a turn unit removably attached to said scanner for turning the document papers from said first paper feeding oath to said second paper feeding path and into said stacker.

2. The system according to claim 1, wherein said auto-feeder is connected to the front side of said scanner, said turn unit is connected to the back side of said scanner, and said stacker is provided in an upper portion of said scanner, so that the document papers are moved horizontally along the first paper feeding path from the front side toward the back side of said scanner, and then are returned, by said turn unit, in reverse direction along said second paper feeding path to said stacker.

3. The system according to claim 1, further comprising a microfilm camera, removably mounted between said turn unit and said scanner, for receiving the document papers fed through said scanner along said first path and for photographing images of the document papers on a microfilm.

wherein the document papers that have passed through said microfilm camera are fed by said turn unit through said microfilm camera in the reverse direction, along said second path, to said stacker.

4. The system according to claim 3, wherein said microfilm camera has a cabinet with the top plane formed into an L-type shape and surrounding the back and one side of said scanner, and microfilm cassette loading ports are arranged in positions of the cabinet situated at the side of said auto-feeder.

5. The system according to claim 1, wherein said scanner transmits a feeding force to said connected turn unit so that said turn unit feeds the document papers at the same speed as said scanner.

6. The system according to claim 1, wherein a multi-sorter is connectable to said scanner instead of said turn unit for sorting and stacking the document papers.

7. The system according to claim 3, wherein a multi-sorter is connectable to said microfilm camera instead of said turn unit for sorting and stacking the document papers.

8. A document reader system for reading images of a large number of document papers while continuously feeding the document papers, comprising:

a scanner for reading the document papers wherein said scanner includes first and second paper feeding paths;

an auto-feeder for continuously feeding the document papers to said scanner;

a stacker provided in said scanner for receiving the document papers read by said scanner; and a turn unit removably attached to said scanner for turning the document papers from said first paper feeding path to said second paper feeding path and into said stacker;

wherein said scanner transmits a feeding force to said connected turn unit so that said turn unit feeds the document papers at the same speed as said scanner.

9. The system according to claim 8, wherein said scanner includes feed rollers which transmit the feeding force from the scanner to the turn unit.

* * * * *